United States Patent

[11] 3,622,101

| [72] | Inventors | Robert C. Sutliff;<br>Archie J. Tucker; Richard L. Bishop, all of Rochester, N.Y. |
|---|---|---|
| [21] | Appl. No. | 24,077 |
| [22] | Filed | Mar. 31, 1970 |
| [45] | Patented | Nov. 23, 1971 |
| [73] | Assignee | Eastman Kodak Company<br>Rochester, N.Y. |

[54] INTEGRAL ANTIBACKUP MECHANISM IN A MOTION PICTURE FILM CARTRIDGE
5 Claims, 4 Drawing Figs.

[52] U.S. Cl. .................................................. 242/194,
242/71.1, 352/72
[51] Int. Cl. ........................................................ G03b 1/04,
G11b 15/32
[50] Field of Search .................................................. 242/193,
194, 197–200, 71.1, 71.2; 352/72–78, 156

[56] References Cited
UNITED STATES PATENTS

| 1,428,480 | 9/1922 | Giroux .......................... | 242/193 X |
| 3,208,685 | 9/1965 | Edwards et al. ............... | 242/194 |
| 3,208,686 | 9/1965 | Edwards et al. ............... | 242/194 |
| 3,263,936 | 8/1966 | Williams ....................... | 242/194 |

Primary Examiner—Leonard D. Christian
Attorneys—William F. Delaney, Jr. and Robert W. Hampton ABSTRACT: A ratchet mechanism for preventing reverse rotation of a takeup spool in motion picture film cartridges of the type having a partition between supply and takeup chambers. The ratchet mechanism comprises a flexible pawl finger integrally formed as a part of the partition, and a ratchet associated with a spool for rotation therewith to cooperate with the pawl finger to prevent rotation of the spool in one direction and permit rotation in the opposite direction for winding up film.

ROBERT C. SUTLIFF
ARCHIE J. TUCKER
RICHARD L. BISHOP
INVENTORS

BY *William F. Delaney Jr.*

*Robert W. Hampton*

ATTORNEYS

INTEGRAL ANTIBACKUP MECHANISM IN A MOTION PICTURE FILM CARTRIDGE

CROSS-REFERENCE TO RELATED APPLICATION

Reference is made to commonly assigned copending U.S. Pat. application, Ser. No. 813,526, entitled "Method and Apparatus for Removing Film from Cartridges," filed Apr. 4, 1969 in the names of Robert C. Sutliff and Archie J. Tucker.

BACKGROUND OF THE INVENTION

The present invention relates to film c cartridges in which a roll of film is sealed before, during and after exposure in the camera. More particularly this invention relates to such cartridges of the type having a partition separating the interior of the cartridge into supply and takeup chambers with a takeup spool rotatably mounted in the takeup chamber.

Many commercially available movie camera cartridges include a substantially rectangular housing in which a supply roll of film and a takeup spool are rotatably mounted in a side-by-side coaxial relation, such as disclosed for example in U.S. Pat. No. 3,208,686 issued Sept. 28, 1965 in the name of E. A. Edwards et al. As initially loaded the film leader is pulled from the supply roll, threaded past the exposure aperture in an end wall of the cartridge and then attached to the takeup spool. After being so loaded with unexposed film, the housing is closed and sealed by one or more covers.

When the film in such a cartridge is to be exposed, the cartridge is placed in a motion picture camera adapted to accommodate the cartridge, and a film advancing mechanism in the camera engages perforations in the film during operation of the camera to intermittently pull film from the supply coil and transport it past the exposure aperture to the takeup spool. A takeup drive in the camera is coupled to the takeup spool in the cartridge to positively drive the spool to wind up the exposed film. Usually such cartridges include devices to overcome the tendency of film rolls to clock spring when the cartridge is subjected to sharp movements. The term "clockspring", as used herein, means radial displacement of successive outr convlutions of the film roll, caused by the tendency of the roll to unwind.

Anticlockspring devices in the takeup chamber of most commercialcartridges operate on the takeup spool in such a manner that reverse rotation of the spool is prevented so that film on the spool cannot be unwound. Such devices usually comprise a rat het arrangement, such as disclosed in copending U.S. Pt. application Ser. No. 813,526, entitled "Method and Apparatus for R%MOVING Film from Cartridges," filed Apr. 4, 1969 in the names of R. C. Sutliff et al. The cartridge disclosed in the Sutliff application includes an antibackup mechanism of the tpe which has been in commercial use in recent years in most super-8 film cartridges. Such devices comprise a shuttle with a plurality of teeth that is movably mounted to engage teeth on the takeup spool in thecartridge to prevent rotation of the spool in one direction. The shuttle is mounted for transverse movement with respect to the axis of rotation of the spool to permit it to be moved out of the way when the spoolis rotated in its forward direction to wind up film.

SUMMARY OF THE INVENTION

It is an object of this invention to provide an improved antibackup mechanism for a takeup spool in a motion picture film cartridge of the type that is separated into supply and takeup chambers by a partition.

It is another object of this invention to provide an improved antibackup mechanism for such a cartridge, which requires less parts and is easier to manufacture and assemble.

It is a further object of this invention to provide such an improved antibackup mechanism which can be disabled in a manner similar to that by which prior art antibackup mechanisms could be disabled.

According to this invention a film cartridge of the type having a partition dividing the interior of the cartridge into supply and takeup chambers, and having a takeup spool rotatably mounted in the takeup chamber is provided with an antibackup mechanism comprising a flexible pawl finger integral with the partition, and a ratchet associated with the spool for rotation therewith to cooperate with said pawl finger to prevent rotation of the spool in one direction and permit rotation in the opposite direction for winding up film.

The ratchet mechanism of this invention provides a positively acting antibackup mechanism for film cartridges, which requires less parts than the prior art mechanisms of the type including a shuttle.

DETAILED DESCRIPTION OF THE INVENTION

Figure 1:
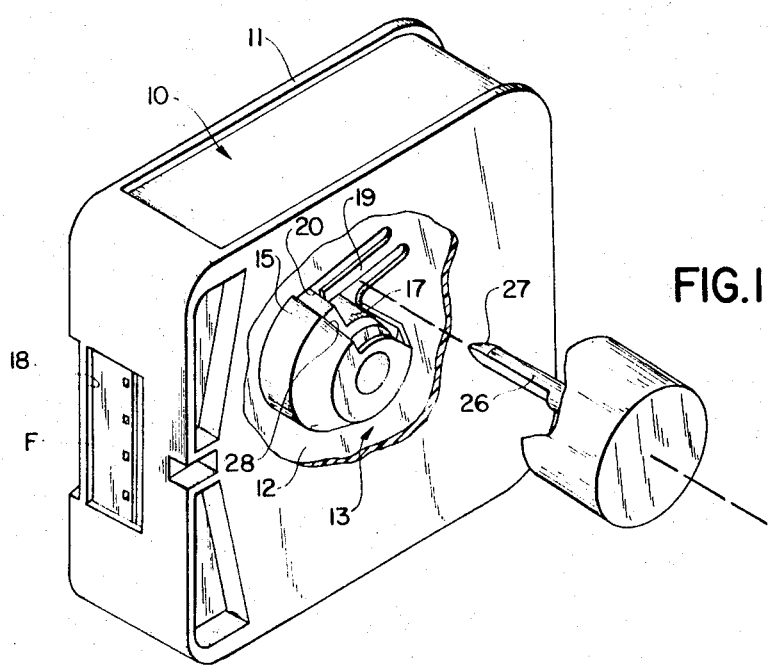
FIG. 1 is a perspective view of the supply side of a cartridge, according to the invention, with a portion of the cartridge housing broken away, and with a punch aligned with respect to the cartridge on a predetermined path to disable the antibackup mechanism in the cartridge.
Figure 2:
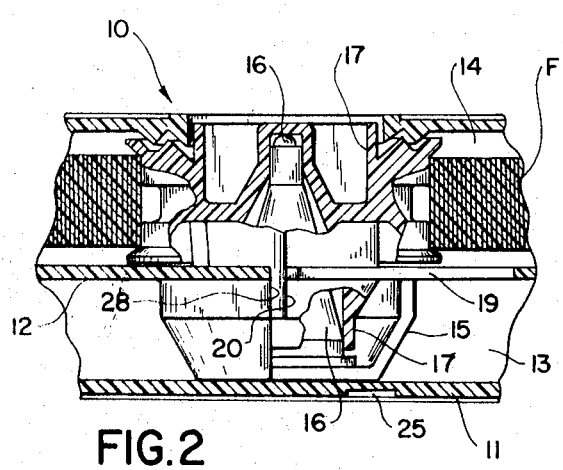
FIG. 2 is an enlarged cross-sectional view of a portion of the cartridge shown in FIG. 1 with a portion of the takeup spool broken away.

As shown in FIG. 1, a cartridge 10 includes a substantially rectangular housing 11 and an internal partition 12 which divides the interior of the housing into a supply chamber 13 and a takeup chamber 14, as seen in FIG. 2. Located in the supply chamber 13 is a hub 15 mounted on the partition 12 for locating a supply roll of film, not shown. Mounted for rotation on a post 16 on the opposite side of the partition 12 is a takeup spool 17 for receiving and winding up exposed film F. As initially loaded, a film leader is pulled from the supply roll, threaded past the exposure aperture 18 in an end wall of the cartridge and then attached to the takeup spool 17 in the takeup chamber 14.

Figure 3:
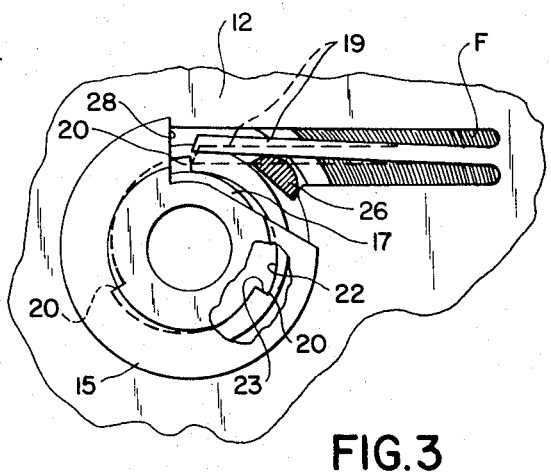
FIG. 3 is an enlarged plan view of the antibackup mechanism shown in FIG. 1.

To prevent film wound on the takeup spool from clockspringing, the cartridge 10 includes an antibackup mechanism which includes, according to the preferred embodiment of the invention, a flexible pawl finger 19 molded integrally with the partition 12, which is adapted to engage teeth 20 on the takeup spool 17. As seen more clearly in FIG. 3, the teeth 20 define gradually inclined surfaces 22 and sharply inclined surfaces 23, such that rotation of the takeup spool in a counterclockwise direction as viewed from the supply side of the cartridge will cause the pawl finger 19 to ride up the gradually inclined surfaces 22 of the teeth 20, so that this ratchet mechanism offers substantially no resistance during film winding operations. However, rotation of the spool in a clockwise direction will cause the sharply inclined surface 23 of one of the teeth 20 on the spool to cooperatively engage the end of the flexible end of the pawl 19, so that rotation of the spool is prevented in that direction and film cannot be unwound from the spool.

The antibackup mechanism of this invention is adapted for disengagement by the method of the above-referenced Sutliff et al. application to permit exposed film to be unloaded through the exposure aperture 18 as the spool rotates in reverse. To adapt the cartridge for this method the cover 11 on the supply side of the cartridge is provided with a thinned-out portion 25, seen in FIG. 2, to permit easier puncturing by a disengaging punch 26 having a tapered end portion 27. In addition, the hub 15 in the cartridge supply chamber is provided with an opening 28 located in the predetermined path of the punch 26. The opening 28 is of sufficient size to provide clearance for the punch to gain access to the pawl 19.

Figure 4:
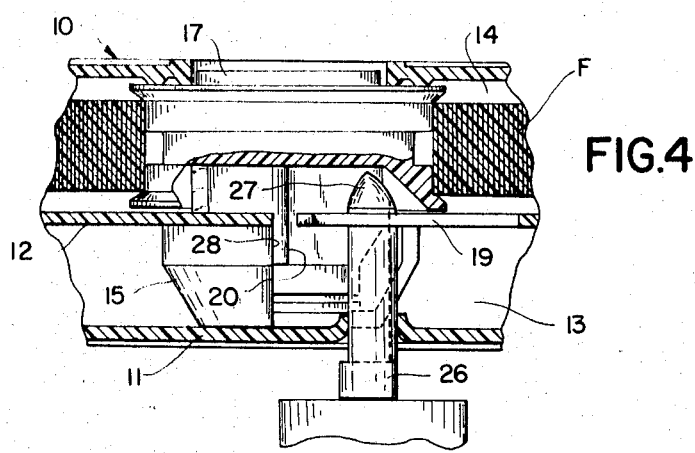
FIG. 4 is an enlarged side view of a portion of the cartridge with the housing and partition in cross section to show the takeup spool and a hub in the supply chamber with the punch inserted into the cartridge to disable the antibackup mechanism.

In order to disengage the antibackup mechanism of this invention the punch 26 punctures the weakened portion 25 of cover 11, as seen in FIG. 4, and passes through the cutaway portion 28 of the hub 15, so that the tapered end portion 27 engages the pawl 19 and cams it out of engagement with the teeth 20 on the spool 17. When the pawl is disengaged from the spool teeth 20 in this manner the exposed film on the spool may be unloaded from the cartridge through the exposure aperture.

The invention has been described in detail with particular interest to the preferred embodiments thereof but it will be understood that variations and modifications can be effected within the spirit and scope of the invention.

We claim:

1. A film cartridge for use in a motion picture camera, comprising:
   a housing defining an exposure aperture;
   a partition within said housing separating the interior of the housing into a supply chamber and a takeup chamber;
   a flexible pawl finger integral with said partition;
   guide means for guiding film advanced from the supply chamber past the exposure aperture to the takeup chamber;
   a takeup spool rotatably mounted in the takeup chamber for winding up advanced film; and
   ratchet means associated with the spool for rotation therewith, said ratchet means cooperating with said pawl finger to prevent rotation of the spool in one direction and permit rotation in the opposite direction for winding up film.

2. A film cartridge for use in a motion picture camera, comprising:
   a housing defining an exposure aperture;
   a partition within said housing separating the interior of the housing into a supply chamber and a takeup chamber, said partition defining a flexible pawl finger;
   guide means for guiding film advanced from the supply chamber past the exposure aperture to the takeup chamber;
   a takeup spool rotatably mounted in the takeup chamber for winding up advanced film; and
   at least one ratchet tooth on said spool cooperatively associated with said pawl finger to prevent rotation of the spool in one direction and permit rotation in the opposite direction for winding up film.

3. A film cartridge for use in a motion picture camera and adapted for cooperation with a punch to unload film therefrom, said cartridge comprising:
   a housing defining an exposure aperture;
   a partition within said housing separating the interior of the housing into a supply chamber and a takeup chamber;
   a flexible pawl finger integral with said partition;
   a hub in the supply chamber for rotatably supporting a supply coil of film so that it can be withdrawn therefrom, said hub defining at least one opening on a predetermined path aligned with a portion of the pawl finger to permit passage of such a punch along that path into engagement with the pawl finger;
   guide means for guiding film advanced from the supply chamber past an exposure aperture to the takeup chamber;
   a takeup spool rotatably mounted in the takeup chamber for winding up advanced film; and
   ratchet means associated with the spool for rotation therewith, said ratchet means cooperating with said pawl finger to prevent rotation of the spool in one direction and permit rotation in the opposite direction for winding up film, said pawl finger being disengageable from said ratchet means by engagement of such a punch advanced along the path.

4. A film cartridge for use in a motion picture camera, comprising;
   a housing defining an exposure aperture;
   a partition within said housing separating the interior of the housing into a supply chamber and a takeup chamber;
   a flexible pawl finger mounted within said housing;
   guide means for guiding film advanced from the supply chamber past the exposure aperture to the takeup chamber;
   a takeup spool rotatably mounted in the takeup chamber for winding up advanced film; and
   ratchet means associated with the spool for rotation therewith, said ratchet means cooperating with said pawl finger to prevent rotation of the spool in one direction and permit rotation in the opposite direction for winding up film.

5. A film cartridge for use in a motion picture camera, comprising:
   a housing defining an exposure aperture, the interior of said housing being partitioned into supply and takeup chambers;
   a flexible pawl finger integrally mounted on an interior wall of the cartridge;
   guide means for guiding film advanced from the supply chamber past the exposure aperture to the takeup chamber;
   a takeup spool rotatably mounted in the takeup chamber for winding up advanced film; and
   ratchet means associated with the spool for rotation therewith, said ratchet means cooperating with said pawl finger to prevent rotation of the spool in one direction and permit rotation in the opposite direction for winding up film.

* * * * *